J. L. PARKINS.
AUTOMATIC WATERING TROUGH.
APPLICATION FILED MAR. 16, 1912.
1,086,785.
Patented Feb. 10, 1914.
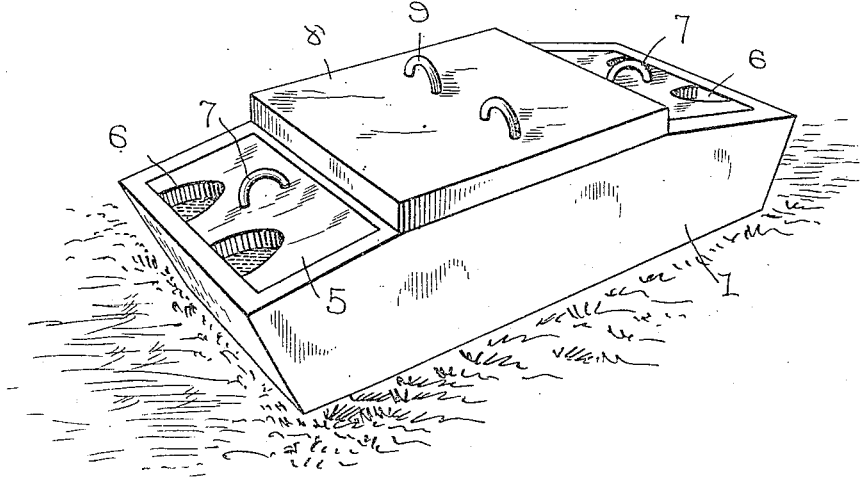
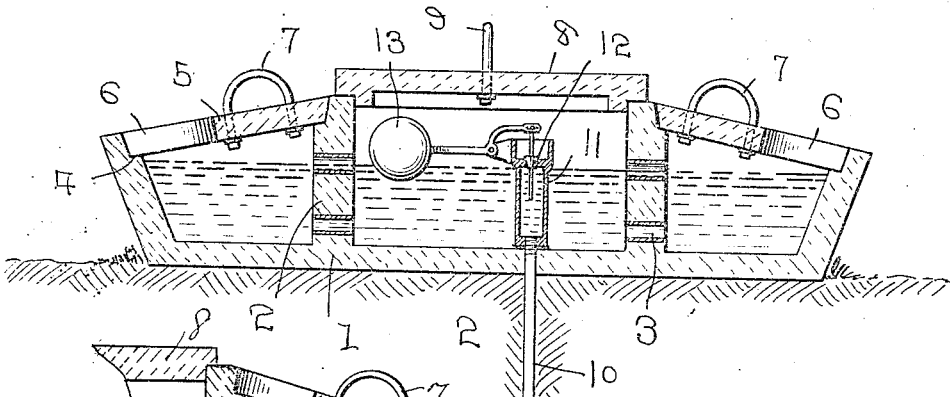
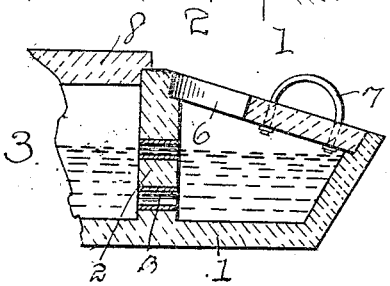
Inventor
J. L. Parkins

UNITED STATES PATENT OFFICE.

JAMES L. PARKINS, OF CLEARFIELD, IOWA.

AUTOMATIC WATERING-TROUGH.

1,086,785.

Specification of Letters Patent.

Patented Feb. 10, 1914.

Application filed March 16, 1912. Serial No. 684,104.

*To all whom it may concern:*

Be it known that I, JAMES L. PARKINS, a citizen of the United States, residing at Clearfield, in the county of Taylor and State of Iowa, have invented certain new and useful Improvements in Automatic Watering-Troughs; and I do hereby declare the following to be a full, clear, and exact description of the invention, such as will enable others skilled in the art to which it appertains to make and use the same.

My invention relates to watering troughs for animals and has for its object to provide a drinking trough of simple and economical construction, with drinking compartments readily accessible to animals to be watered, which trough will be automatically maintained full of water, readily cleansed, and adaptable for the accommodation of different classes of animals, as may be desired.

With these objects in view, the invention consists in the improved construction, arrangement and combination of the parts of a device of the character specified, which will be hereinafter fully described, and afterward specifically claimed.

In order that the construction and operation thereof may be readily comprehended, I will now proceed to fully describe my invention in connection with the accompanying drawings, which illustrate an approved embodiment thereof, and in which drawings—

Figure 1 is a perspective view of a preferred form of my invention, Fig. 2 is a longitudinal sectional view therethrough, and, Fig. 3 is a view similar to Fig. 2 showing only one end of the trough, arranged to permit the larger animals to drink, but preventing such animals as hogs from drinking.

Like reference characters mark the same parts in all of the figures of the drawings.

Referring to the drawings, 1 indicates a trough, which is preferably divided into a central compartment and two end compartments by means of vertical partitions 2 which extend to a greater height than the end walls of the trough, for a purpose hereinafter clearly set forth, and have openings 3 therein so that water may flow from the central compartment into the end compartments, as hereinafter more clearly set forth.

The partitions and the end walls of the trough have seats 4 formed therein so that cover sections 5 may be placed over the end compartments and rest flush with the upper ends of the end walls and partitions. By forming the partitions of greater height than the end walls, the cover sections 5 will be disposed obliquely to the horizontal plane of the trough, thus compelling an animal such as a hog to walk to the end of the trough when desiring a drink.

The cover sections are provided with openings or notches 6 in one edge so that such an animal may have easy access to the water contained in the drinking compartments. The cover sections are also provided with handles 7, by means of which the same may be readily removed when it is desired to clean the compartments, and replaced in the same, or in reversed positions, with the notches next to the partitions as seen in Fig. 3.

The central compartment of the trough is also provided with a cover section 8 having handles 9 secured thereto, whereby the same may be easily removed when it is desired to obtain access to said central compartment. The handles 7 and 9 are preferably formed of U-shaped material having their ends extended through the cover sections, and provided with nuts turned thereon, to prevent their removal.

The trough and cover sections are preferably, but not necessarily, formed of cement, or other plastic material. The central compartment has an opening through its lower surface for the reception of a water supply pipe, the upper end of which carries a valve 11. When the water has reached a certain height in the trough, the valve 11 is closed by means of a plunger 12, operated by the ordinary type of ball float 13.

When an animal drinks from one of the end compartments and lowers the level of the water, the float 13 will lower and open the valve 11 to allow a new supply of water to flow into the trough, whereby the level of the water therein will always be maintained.

The trough shown in Figs. 1 and 2 of the drawings is particularly useful for watering hogs and other small animals, but when the covers 5 are reversed, as shown in Fig. 3, cattle or horses may drink from the troughs, but hogs are prevented from doing so.

By providing the trough with the partition 2 the water in the central compartment will be maintained clean and the valve will not be affected or ruined by dirt.

Having thus fully described my invention, what I claim as new and desire to secure by Letters-Patent of the United States is:

1. A watering trough for animals comprising a central compartment and adjacent drinking compartments, the latter being provided with inclined reversible covers having notches or drinking openings in one edge, as and for the purpose set forth.

2. A watering trough for animals having partitions forming end drinking compartments and an intermediate supply compartment, the dividing partitions having openings for the free passage of water, an automatic supply valve in the intermediate compartment, and inclined covers for the drinking compartments, each inclined cover having substantially semicircular openings in one edge and being reversible to bring said openings into either the higher or lower positions for the accommodation of either large or small animals.

In testimony whereof I have signed my name to this specification in the presence of two subscribing witnesses.

JAMES L. PARKINS.

Witnesses:
C. F. LYDDON,
J. H. FITCH.